(12) United States Patent
Ryu et al.

(10) Patent No.: US 7,894,831 B2
(45) Date of Patent: Feb. 22, 2011

(54) CONTROLLING IDLE MODE OF MOBILE SUBSCRIBER STATION IN WIRELESS ACCESS SYSTEM

(75) Inventors: Ki Seon Ryu, Seoul (KR); Beum Joon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/146,542

(22) Filed: Jun. 6, 2005

(65) Prior Publication Data

US 2006/0009241 A1 Jan. 12, 2006

(30) Foreign Application Priority Data

| Jun. 8, 2004 | (KR) | ................ 10-2004-0041572 |
| Feb. 23, 2005 | (KR) | ................ 10-2005-0014751 |
| Mar. 8, 2005 | (KR) | ................ 10-2005-0019324 |

(51) Int. Cl.
*H04W 68/00* (2009.01)
(52) U.S. Cl. ............. 455/458; 455/432.1; 455/435.1; 455/436; 370/331
(58) Field of Classification Search ............. 455/456, 455/458, 432.1, 435.1, 436–444; 370/329, 370/331
See application file for complete search history.

(56) References Cited

U.S. PATENT DOCUMENTS

| 6,021,122 | A  * | 2/2000 | Tiedemann, Jr. ............. 370/331 |
| 6,173,181 | B1 * | 1/2001 | Losh .......................... 455/434 |
| 6,195,551 | B1 * | 2/2001 | Kim et al. .................... 455/436 |
| 6,320,855 | B1 * | 11/2001 | Shi ............................ 370/332 |

(Continued)

FOREIGN PATENT DOCUMENTS

CN 1451252 10/2003

(Continued)

OTHER PUBLICATIONS

Barber, P. et al. "MSS Idle Mode", IEEE 802.16 Broadband Wirless Access Working Group, IEEE C802, 16e-04/42r7, [online]. Mar. 18, 2004 [retrieved on Oct. 13, 2006]. Retrieved from the Internet:, URL:http://www.ieee802.org/16/tge/contrib./C80216e-04_42r7. pdf.. pp. 2-11.

(Continued)

*Primary Examiner*—Marivelisse Santiago-Cordero
*Assistant Examiner*—Yungsang Lau
(74) *Attorney, Agent, or Firm*—Lee, Hong, Degerman, Kang & Waimey

(57) ABSTRACT

A method of controlling idle mode comprises requesting to enter idle mode by a mobile subscriber station by transmitting an idle mode request to a serving base station having a serving paging group identifier with which the serving base station is associated. The method also comprises entering the idle mode by receiving an idle mode grant command from the serving base station. The method also comprises initiating a ranging request between the mobile subscriber station and the target base station associated with the target paging group, wherein the ranging request comprises the serving base station identifier and the serving paging group identifier. The method also comprises connecting with the target base station, wherein the serving base station is informed, by using the serving base station identifier, that the mobile subscriber station is not in the idle mode with the serving base station.

10 Claims, 6 Drawing Sheets

U.S. PATENT DOCUMENTS

| | | | |
|---|---|---|---|
| 6,480,476 B1 * | 11/2002 | Willars | 370/311 |
| 6,490,455 B1 * | 12/2002 | Park et al. | 455/456.4 |
| 6,950,415 B2 * | 9/2005 | Chang et al. | 370/331 |
| 7,092,716 B2 * | 8/2006 | Nizri et al. | 455/448 |
| 2002/0075823 A1 | 6/2002 | Lee | |
| 2003/0064724 A1 * | 4/2003 | Park | 455/436 |
| 2004/0071113 A1 * | 4/2004 | Tiedemann, Jr. | 370/331 |
| 2004/0176113 A1 * | 9/2004 | Chen et al. | 455/458 |
| 2005/0197125 A1 * | 9/2005 | Kang et al. | 455/439 |

FOREIGN PATENT DOCUMENTS

| | | |
|---|---|---|
| EP | 1 376 972 A2 | 1/2004 |
| WO | WO 01/97549 A1 | 12/2001 |
| WO | WO 02/063912 A1 | 8/2002 |

OTHER PUBLICATIONS

Kitroser, I. et al. "IEEE802.16e Sleep Mode", IEEE c802.16e-03/15, ieee 802.16 Broadband Wireless Access Working Group [online], Mar. 6, 2003 [retrieved on Oct. 13, 2006], Retrieved from the Internet: ,URL:http://www.ieee802.org/16/tge/contrib./C80216e-03_15.pdf.. pp. 5-10, 12.

IEEE 802.16 Task Group e. "Part 16: Air Interface for Fixed and Mobile Broadband Wireless Access Systems—Amendment for Physical and Medium Access Control for Combined Fixed and Mobile Operation in Licensed Bands", IEEE 802.16e-03/07r5, IEEE 802.16 TGe Working Document [online], Dec. 9, 2003 [retrieved on Oct. 13, 2006]. Retrieved from the Internet: ,URL:http://www/ieee802.org/16/tge/docs/80216e-03_07r5.zip.. subsections 6.4.2.3.5, 6.4.2.3.52.

Sarkar, et al., "Cdma2000: battery life improvement techniques", The 11th IEEE International Symposium on Personal, Indoor and Mobile Radio Communications, 2000. PIMRC 2000. vol. 2, Sep. 18-21, 2000.

Hyun Suk Roh, et al., "Paging Scheme for High-Speed Portable Internet (HPi) System," The 8th International Conference Advanced Communication Technology (ICACT 2006), Feb. 20, 2006, pp. 1723-1732, vol. 3.

J. Vuori, et al., "A New Wireless Paging Network Architecture," 5th IEEE International Symposium on Personal, Indoor and Mobile Radio Communications (PIMRC '94), Wireless Networks—Catching the Mobile Future, Sep. 18, 1994, pp. 1183-1187, vol. 4.

J. Son et al., "Location Management for supporting IDLE mode in IEEE P802.16e," IEEE 802.16 Broadband Wireless Access Working Group, IEEE C802.16e-04/66r1, May 2004.

* cited by examiner

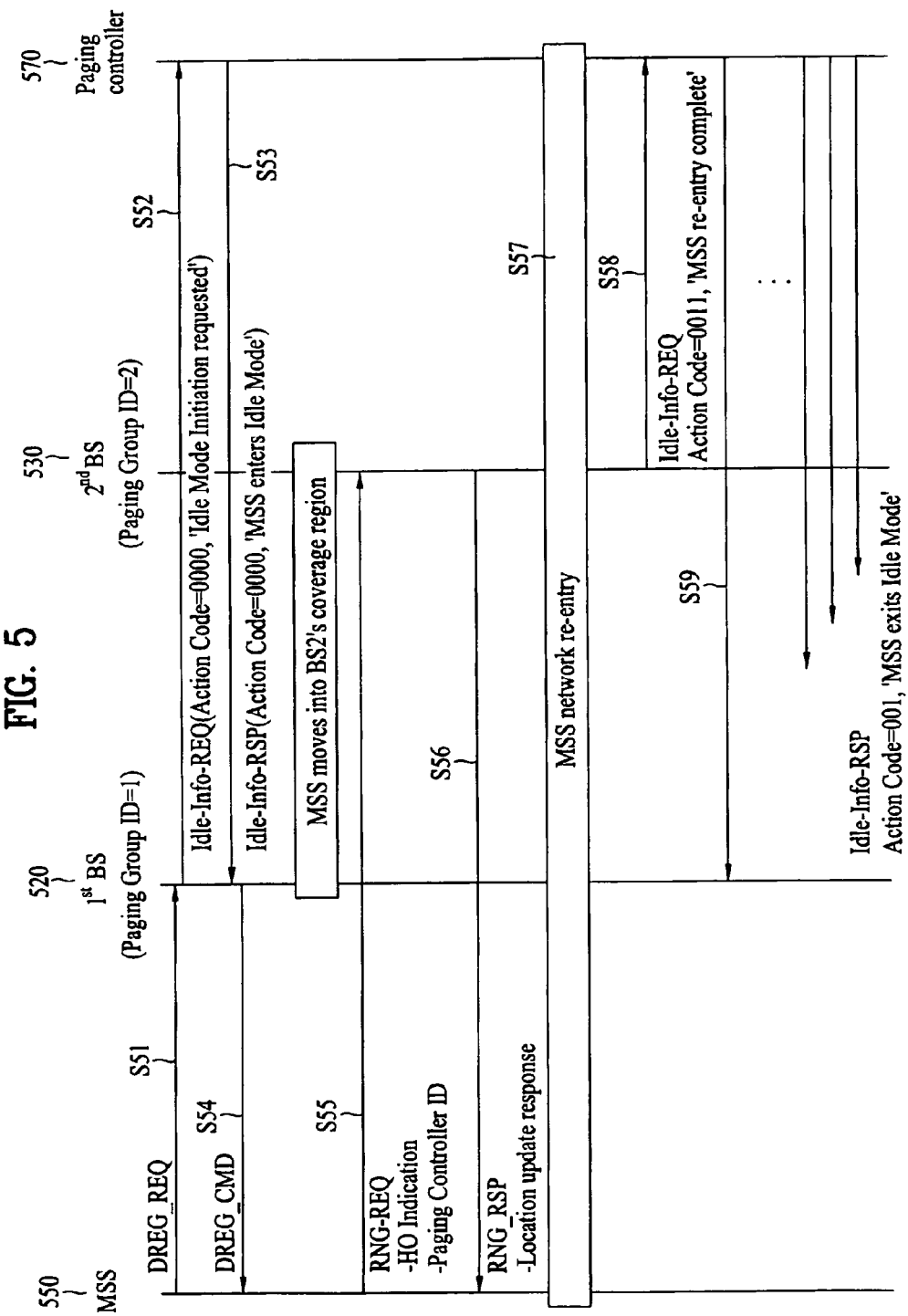

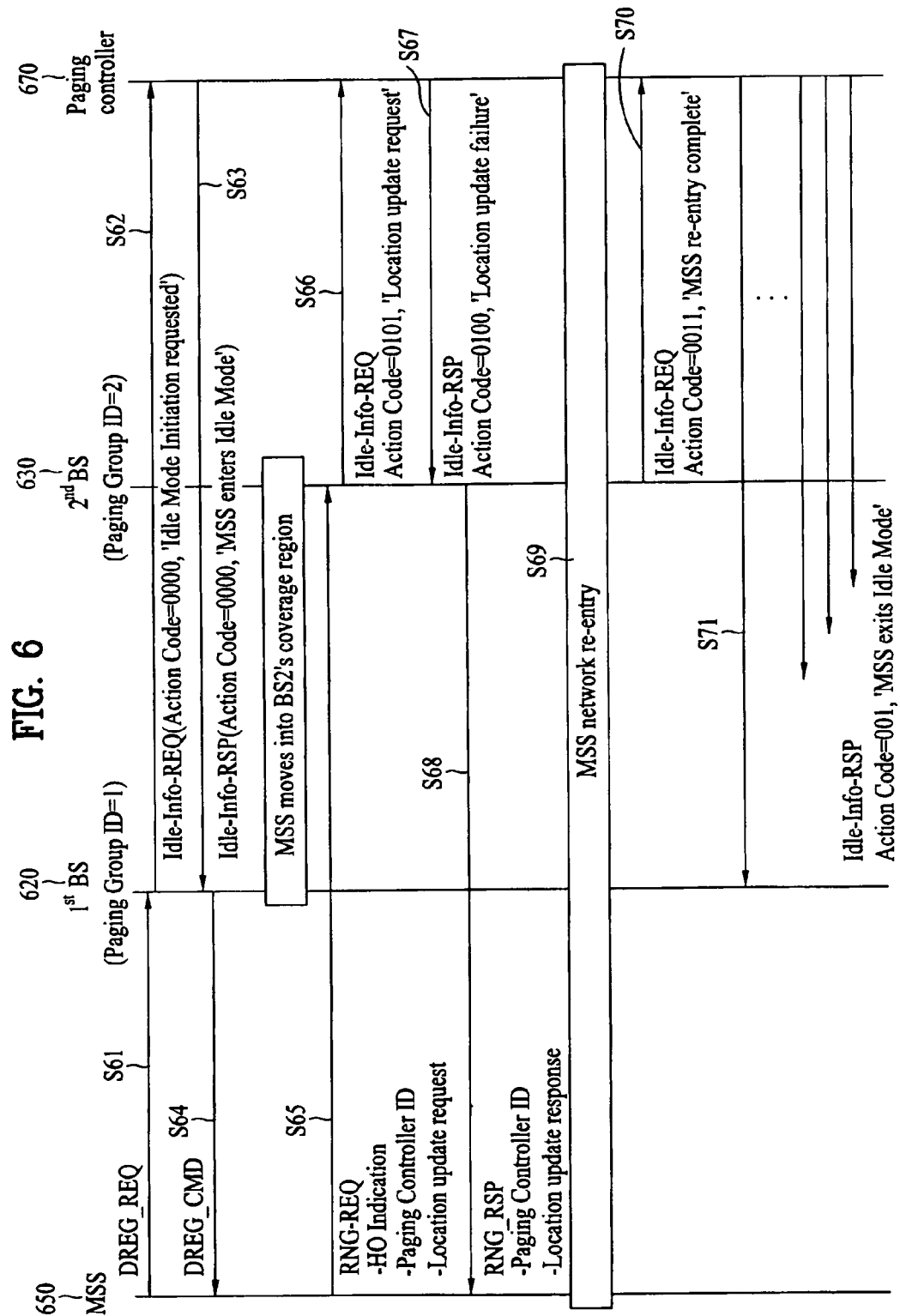

CONTROLLING IDLE MODE OF MOBILE SUBSCRIBER STATION IN WIRELESS ACCESS SYSTEM

CROSS-REFERENCE TO RELATED APPLICATIONS

Pursuant to 35 U.S.C. §119(a), this application claims the benefit of earlier filing date and right of priority to Korean Application No. 10-2004-0041572, filed on Jun. 8, 2004, Korean Application No. 10-2005-0014751, filed on Feb. 23, 2005, and Korean Application No. 10-2005-0019324, filed on Mar. 8, 2005, the contents of which are hereby incorporated by reference herein in their entirety.

FIELD OF THE INVENTION

The present invention relates generally to a wireless access system and, more particularly, to idle mode in a mobile subscriber station.

BACKGROUND OF THE INVENTION

Broadband wireless access systems typically support an idle-mode to minimize the power consumption of a mobile subscriber station (MSS). During the idle-mode, the MSS does not perform a handover procedure when moving between base stations in the same paging zone. Therefore, the MSS does not need to transmit uplink information for the handover procedure, which reduces corresponding power consumption.

A paging zone is defined as a zone that is controlled by a plurality of base stations called a paging group. Each of the base stations in the paging group has the same paging cycle (Paging_Cycle) and the same paging offset (Paging_Offset).

The MSS may make a request to a base station to switch to the idle-mode. The base station then provides a paging message including its paging-group ID, a corresponding paging cycle, and a corresponding paging offset. The corresponding MSS may thus be switched to the idle-mode. During the idle-mode, the MSS may determine whether to continue or terminate the idle-mode based on the paging message provided by the base station at each paging cycle.

If traffic needs to be transmitted by the MSS while in the idle-mode, the MSS may terminate the idle-mode. For example, the MSS may be enabled to terminate the idle-mode by the BS. Furthermore, if the MSS moves to another paging zone or loses its sync while in an idle-mode and is unable to receive a paging at a predefined time, the MSS may terminate the idle-mode.

When the MSS is in the idle-mode, the MSS normally receives a periodic paging to secure its free move in the same paging zone without performing the handover procedure.

In configuring a paging zone, a backbone message (paging-group-action), is transferred by wire between base stations. An exemplary paging-group-action backbone message is shown in Table 1.

TABLE 1

| Field | Size | Notes |
| --- | --- | --- |
| Message Type | 8 bits | |
| Sender BS ID | 48 bits | Base station unique identifier (Same number as that broadcasted on the DL-MAP message) |
| Target BS ID | 48 bits | Base station unique identifier (Same number as that broadcasted on the DL-MAP message) |

TABLE 1-continued

| Field | Size | Notes |
| --- | --- | --- |
| Time Stamp | 32 bits | Number of milliseconds since midnight GMT (set to 0xTTTTTTTT to ignore) |
| Action | 4 bits | 0 - Assign target BS to paging groups<br>1 - Remove target BS from paging groups<br>2 - Query (which paging groups target BS belong to?)<br>3 - Information (Paging groups sender BD belongs to) |
| Num Records | 4 bits | Number of paging-group-ID records |
| For(j=0; j<Num Records; j++) { | | |
| Paging-group_ID | 16 bits | Paging group ID |
| PAGING_CYCLE | 16 bits | Cycle in which the paging message is transmitted within the paging group |
| PAGING OFFSET | 8 bits | MSS PAGING OFFSET parameter |
| } | | |
| Security field | TBD | A means to authenticate this message |
| CRC field | 32 bits | IEEE CRC-32 |

The paging-group-action backbone message is communicated between base stations. The paging-group-action backbone message may be used for four purposes based on contents of an action field (Action). A receiving base station (target BS) may be assigned (designated) to a specific paging group (Action=0). Alternatively, the target BS may be excluded from the specific paging group (Action=1). Alternatively, the target BS may be queried regarding the paging group to which the target BS belongs (Action=2). Alternatively, the target BS may be informed of the paging group to which a transmitting base station (sender BS) belongs (Action=3).

Since a single base station may belong to one or more paging zones, the paging-group-action backbone message may contain information pertaining to a multitude of paging groups. The base stations may be informed of the paging cycle and offset used in each paging zone via the paging-group-action backbone message. Furthermore, the base stations may be dynamically assigned to the paging groups via the paging-group-action backbone message.

In switching an MSS to an idle mode, a DREG_REQ message (one of previous MAC messages) is used. A format of the DREG_REQ message is shown in Table 2.

TABLE 2

| Syntax | Size | Notes |
| --- | --- | --- |
| DREG-REQ_Message_Format( ) { | | |
| Management Message Type = 29 | 8 bits | |
| De-registration Request Code | 8 bits | 0x00 = SS de-registration request from BS and network<br>0x01 = request for MSS deregistration from Serving BS and invitation of MSS paging Availability mode<br>0x02-0xFF = reserved |
| Paging Cycle request | 16 bits | Only valid if De-registration Request Code = 0x01 |
| TLV encoded parameters | Variable | |
| } | | |

An MSS may send a request to a serving base station that the MSS will be switched to idle mode by setting a De-registration Request Code of the DREG_REQ message to 0x01 and then delivering the DREG_REQ message to the base station. This enables delivery of a specific paging cycle.

The serving base station receives the DREG_REQ message and may respond to the request by the MSS via a conventional DREG_CMD message. A format of the DREG_CMD message is shown in Table 3.

TABLE 3

| Syntax | Size | Notes |
|---|---|---|
| DREG-CMD_Message_Format( ) { | | |
| Management Message Type = 29 | 8 bits | |
| Action code | 8 bits | |
| TLV encoded parameters | Variable | |
| } | | |

The serving base station may allow the switching to the idle mode via an action code (Action code=0x05). Alternatively, the serving base station may allow the MSS to make the request for the switching to the idle mode after a time duration (Action code=0x06). Alternatively, the serving base station may not allow the MSS to make the request for the switching to the idle mode until the serving base station transmits the DREG_CMD message (Action code=0x07).

Details of the action code of the DREG_CMD message are shown in Table 4.)

TABLE 4

| Action Code | Action |
|---|---|
| 0x00 | SS shall leave the current channel and attempt to access another channel |
| 0x01 | SS shall listen to the current channel but shall not transmit until an RES_CMD message or DREG_CMD with Action Code 0x00 is received. |
| 0x02 | SS shall listen to the current channel but only transmit on the Basic, Primary Management, and Secondary Management Connections. |
| 0x03 | SS shall return to normal operations and may transmit on any of its active connections. |
| 0x04 | SS shall terminate current Normal Operations with the BS: the BS shall transmit this action code only in response to any SS DREG_REQ. |
| 0x05 | Require MSS de-registration from Serving BS and request initiation of MSS idle mode. |
| 0x06 | The MSS may retransmit the DREG_REQ message after the time duration (REQ-duration) given by. |
| 0x07 | The MSS shall not retransmit the DREG_REQ message and shall wait the DREG-CMD message. |
| 0x08-0xFF | Reserved |

Base stations belonging to the same paging zone may be able to share the information pertaining to the MSS switched to the idle mode. Using this information, the serving BS may notify the MSS of procedures to execute in each paging cycle.

A Paging-announce backbone message is shown in Table 5.

TABLE 5

| Field | Size | Notes |
|---|---|---|
| Message Type | 8 bits | |
| Sender BS ID | 48 bits | Base station unique identifier (Same number as that broadcasted on the DL-MAP message) |
| Target BS ID | 48 bits | Set to 0xffffff to ignore |
| Time Stamp | 32 bits | Number of milliseconds since midnight GMT (set to 0xffffffff to ignore) |
| Num MSS | 8 bits | Number of MSSs to page |

TABLE 5-continued

| Field | Size | Notes |
|---|---|---|
| For(j=0; j<Num MSS; j++) { | | |
| MSS MAC address | 48 bits | |
| PAGING_CYCLE | 16 bits | MSS PAGING CYCLE parameter |
| PAGING OFFSET | 8 bits | MSS PAGING OFFSET parameter |
| } | | |
| Security field | TBD | A means to authenticate this message |
| CRC field | 32 bits | IEEE CRC-32 |

The paging-announce backbone message may be delivered to all base stations belonging to the same paging zone. The base stations receiving the paging-announce backbone message perform the paging by matching MAC addresses of MSSs included in the message with the paging cycle and offset within the message.

Consequently, due to the paging-announce backbone message, all of the base stations belonging to a specific paging zone may identically maintain MAC addresses of MSSs to page. Thus, a specific MSS may receive its paging information at each paging cycle unless the MSS leaves (deviates from) a current paging zone.

A format of a paging message MOB-PAG_ADV transmitted to MSSs in the idle mode via paging by each base station is shown in Table 6. The paging message is delivered to MSSs in a broadcast format.

TABLE 6

| Field | Size | Notes |
|---|---|---|
| MOB_PAG-ADV_Message_Format( ) { | | |
| Management Message Type=?? | 8 bits | |
| Num_Paging Group IDs | 8 bits | Number of Paging Group Ids in this message |
| For(i=0; i<Num_Paging_Group_IDs; I) { | | |
| Paging Group ID | 8 bits | |
| } | | |

TABLE 6-continued

| Field | Size | Notes |
|---|---|---|
| For(j=0; j<Num _MACs; j++) { | | Number of MSS MAC Addresses in message may be determined from the length of the message (found in the generic MAC header). |
| MSS MAC address hash | 24 bits | The hash is obtained by computing a CRC24 on the MSS 48-bit MAC address. The polynomial for the calculation is 0x864CFB. |
| Action Code | 2 bits | Paging action instruction to MSS<br>00 = No Action Required<br>01 = Perform Ranging to establish location and acknowledge message<br>10 = Enter Network<br>11 = Reserved |
| Reserved } } | 6 bits | |

The MSS receives the paging message and may decide whether to maintain the idle mode continuously (Action Code=00), whether to perform ranging to establish a location information update (Action Code=01), and/or whether to terminate the idle mode to receive downlink traffic (Action Code=10).

The MSS may terminate the idle mode if the MSS needs to transmit traffic (uplink traffic occurrence). The MSS also may terminate the idle mode if the MSS needs to receive traffic (downlink traffic occurrence). The MSS also may terminate the idle mode if the MSS is unable to receive a periodic paging due to deviation from a current paging zone or due to a transmission problem.

FIG. 1 is a diagram illustrating a procedure for terminating an idle mode of a mobile subscriber station (MSS) in case of downlink traffic occurrence.

Referring to FIG. 1, a procedure for terminating the idle mode in a MSS is explained, with respect to a case where downlink traffic 101 needs to be delivered to an MSS in an idle mode. Base stations are unaware of the domain to which the MSS in an idle mode belongs. Downlink traffic is unconditionally delivered to a first base station (initial base station) to which the MSS initially made the request for switching to the idle mode.

Upon receipt of the downlink traffic to the MSS, the initial base station sets an action code to 11 for all base stations lying within the paging zone of the initial base station. The initial base station then transmits a paging-announce backbone message to the MSS (S11).

Each of the base stations receive the paging-announce message, sets an action code of a paging message MOV_PAG_ADV to 10, and transmits the paging message all of the MSSs lying within the paging zone, in a broadcast format (S12).

The corresponding MSS receives the paging message, terminates the idle mode, and requests a second base station (current base station) that is in charge of the paging zone where the MSS currently lies, for a re-registration to a network (S13). The second base station receives a base station ID of the first base station via the paging-announce message.

The second base station receives the re-registration request and sets an action flag of an MSS_Info_Request backbone message to 1. The MSS_Info_Request backbone message is communicated between base stations by wire, and then transmitted to notify the first base station that the MSS is seeking to exit the paging zone (S14).

A format of an MSS_Info_Request backbone message is shown in Table 7.

TABLE 7

| Field | Size | Notes |
|---|---|---|
| Global Header | 152 bits | |
| For (j=0; j<Num Records; j++){ | | |
| MSS unique identifier | 48 bits | 48-bit unique identifier used by MSS (as provided by the MSS or by the I-am-host-of message) |
| Action flag | 8 bits | 0 - Request information<br>1 - MSS arrived from Idle mode<br>2 - MSS has transitioned to another paging group |
| } Security field | TBD | A means to authenticate this message |

The first base station receives the MSS_Info_Request and notifies the base stations within the same paging zone that the MSS has terminated the idle mode and is to be deleted from a paging list.

SUMMARY OF THE INVENTION

Accordingly, the present invention is directed to controlling an idle mode of a mobile subscriber station (MSS) in a wireless access system that substantially obviates one or more problems of the related art.

An object of the present invention is to provide a method for controlling an idle mode of a mobile subscriber station in a wireless access system, in a case where the idle mode of an MSS in a first paging zone needs to be terminated when the mobile subscriber station has moved out of one paging zone into another paging zone. The base station that initially allowed the idle mode is notified of the termination of the idle mode to prevent unnecessary paging in the previous paging zone.

Another object of the present invention is to provide a method for controlling an idle mode of a mobile subscriber station in a wireless access system, by which the idle mode is efficiently controlled using a paging controller in a case where a mobile subscriber station moves away from one paging zone into another paging zone.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, in a method of controlling idle mode between a mobile subscriber station and a network at least comprising a serving base station associated with a serving paging group and a target base station associated with a target paging group, the method comprises requesting to enter an idle mode by the mobile subscriber station by transmitting an idle mode request to the serving base station having a serving paging group identifier with which the serving base station is associated and the serving base station identifier. The method also comprises entering the idle mode by receiving an idle mode grant command from the serving base station, the idle mode grant command comprising the serving base station identifier and the serving paging group identifier. The method also comprises initiating a ranging request between the mobile subscriber station and the target base station associated with the target paging group, wherein the ranging request comprises the serving base station identifier and the serving paging group identifier. The method also comprises connecting with the target base station, wherein the serving base station is informed, by using the serving base station identifier, that the mobile subscriber station is not in the idle mode with the serving base station.

The network may preferably further comprise a paging controller that is operatively connected to the serving base station. The serving base station identifier may preferably be substituted with a paging controller identifier that is associated with the paging controller. The ranging request to the target base station may preferably further comprise a location update request. The method may preferably further comprise receiving a ranging response from the target base station, wherein the ranging response comprises a location update response.

In another embodiment, in a method of controlling idle mode between a mobile subscriber station and a network comprising at least a serving base station associated with a serving paging group and a target base station associated with a target paging group, the method comprises receiving an idle mode request from the mobile subscriber station to the serving base station to enter an idle mode by the mobile subscriber station, the serving base station having a serving paging group identifier with which the serving base station is associated and the serving base station identifier. The method also comprises transmitting an idle mode grant command to the mobile subscriber station from the serving base station, the idle mode grant command comprising the serving base station identifier and the serving paging group identifier. The method also comprises receiving a connection request from the mobile subscriber station to the target base station associated with the target paging group, wherein the connection request comprises the serving base station identifier and the serving paging group identifier. The method also comprises connecting with the target base station, wherein the serving base station is informed, by using the serving base station identifier, that the mobile subscriber station is not in the idle mode with the serving base station.

The connection request to the target base station may preferably further comprise a location update request. The method may preferably further comprise transmitting an idle mode information request message to the paging controller, receiving an idle mode information response from the paging controller, and transmitting a ranging response to the mobile subscriber station.

The paging controller may preferably inform the serving base station and other base stations associated with the serving paging group that the mobile subscriber station is not in the idle mode with the serving base station. The paging controller may preferably inform the target base station and other base stations associated with the target paging group that the mobile subscriber station re-entered the idle mode with the target base station.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

FIG. 5 is a diagram illustrating idle mode control in a wireless access system having a paging controller, according to a third embodiment of the present invention.

FIG. 6 is a diagram illustrating idle mode control in a wireless access system having a paging controller, according to a fourth embodiment of the present invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

The present invention may be used in the context of the IEEE802 broadband wireless access system standard. Alternatively, the present invention may be used in the context of any type of wireless access system.

Figure 1:
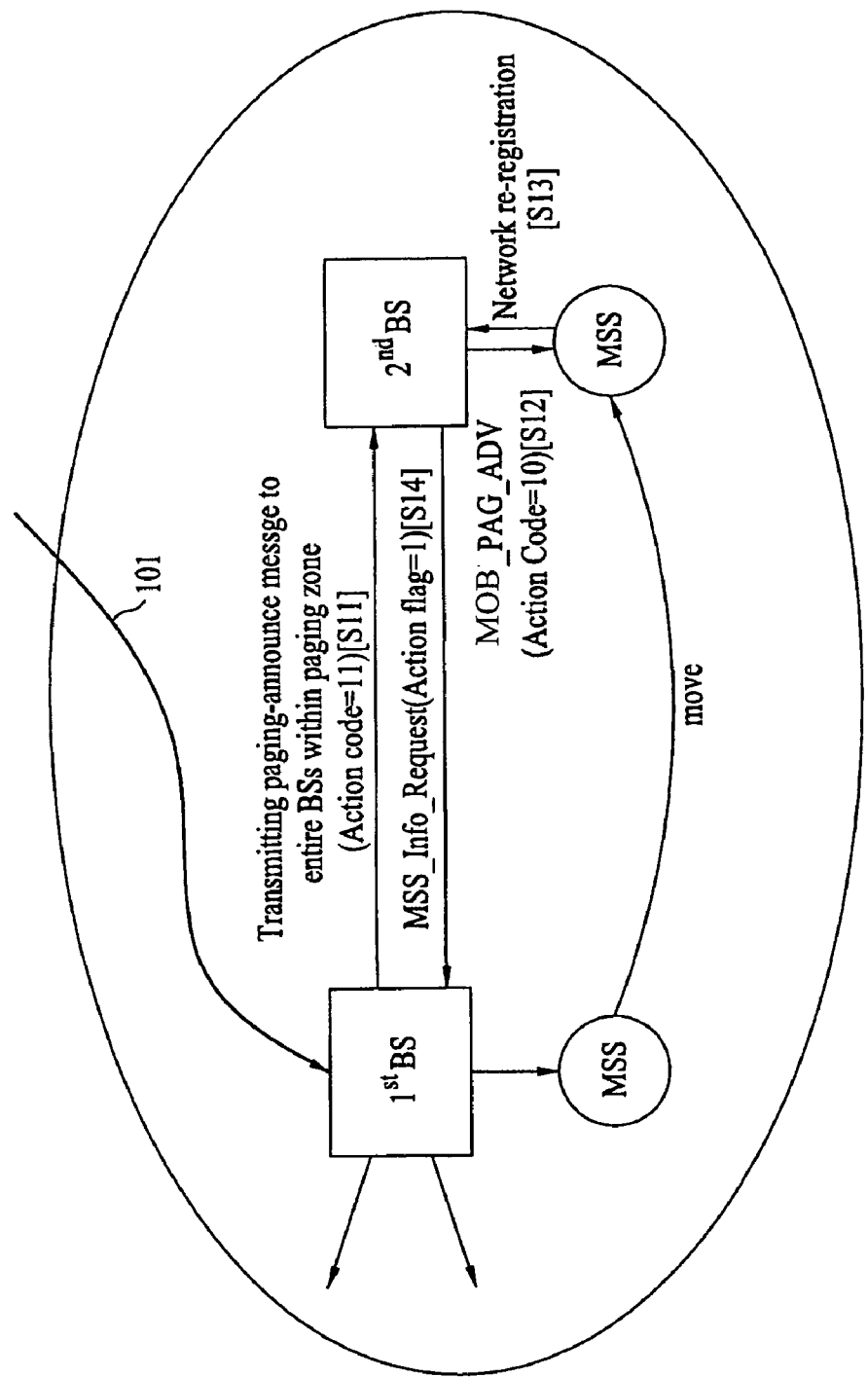
FIG. 1 is a diagram illustrating a procedure for terminating an idle mode of a mobile subscriber station (MSS) in case of downlink traffic occurrence.
Figure 2:
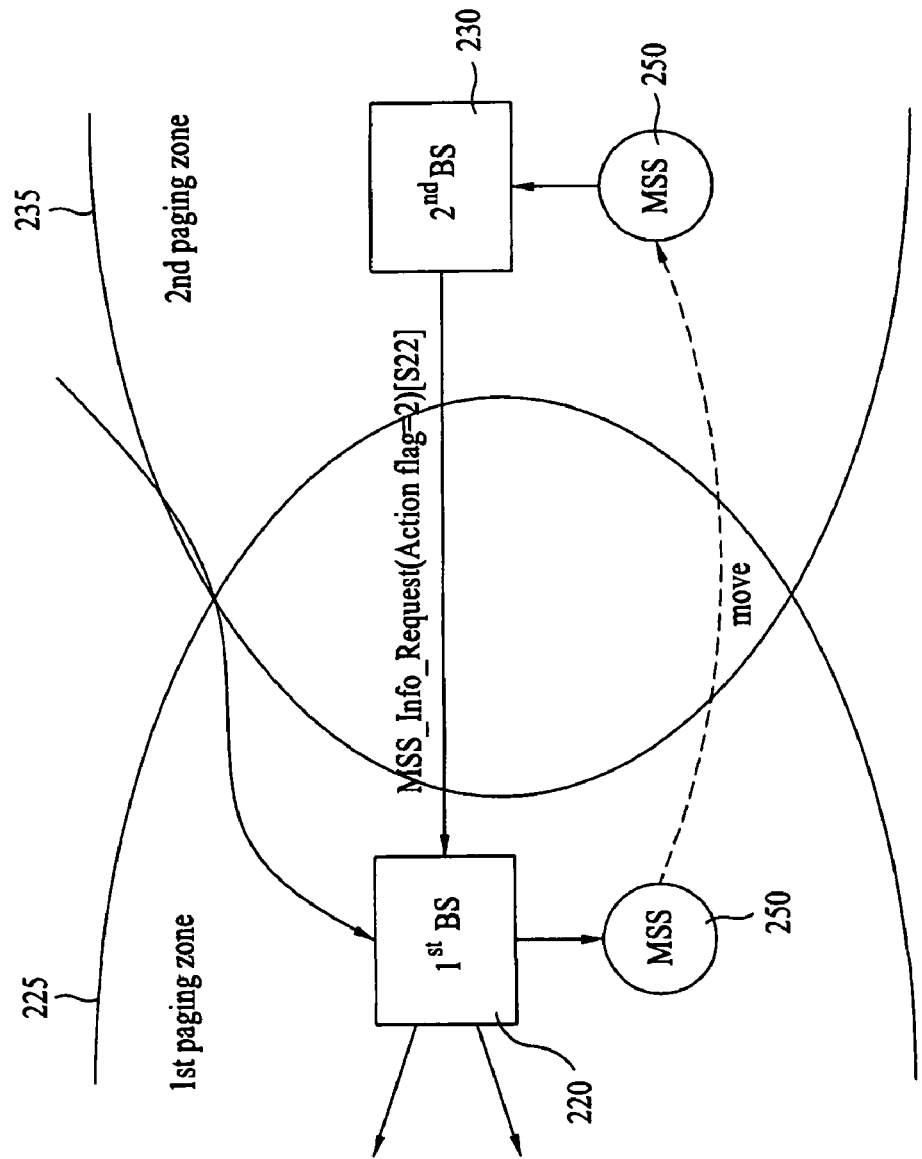
FIG. 2 is a diagram illustrating a procedure for terminating an idle mode of a mobile subscriber station (MSS) in a wireless access system, according to one embodiment of the present invention.

FIG. 2 is a diagram illustrating a procedure for terminating an idle mode of a mobile subscriber station (MSS) in a wireless access system, according to one embodiment of the present invention.

Referring to FIG. 2, an MSS 250 in an idle mode within a first paging zone 225 is shown. The MSS 250 is also shown as moved to a second paging zone 235. A procedure for terminating the idle mode of the MSS 250 in the first paging zone 225 may be executed.

With reference to terminating the idle mode, each paging zone may use a different paging cycle and a different paging offset. When the MSS 250, which was in the idle mode within the first paging zone 225, moves into the second paging zone 235, the MSS 250 may not be able to receive a periodic paging. A first base station (initial base station) 220 may allow the MSS 250 to switch to the idle mode in the first paging zone 225.

The MSS 250 may terminate the idle mode and request a second base station 230 within the second paging zone 235 for a re-registration to a network (S21). The second base station 230 may be unaware of a base station ID of the first base station 220. The MSS 250 may therefore provide the base station ID of the first base station 220 when requesting the re-registration to the network.

To provide the base station ID of the first base station 220 to the second base station 230, a network re-registration request message (e.g., RNG_REQ) may be used. A preferable configuration of the RNG_REQ message is shown in Table 8.

TABLE 8

| Name | Type (1 byte) | Length | Value (Variable-length) |
|---|---|---|---|
| Serving BS ID | 4 | 6 | The unique identifier of the former serving BS |
| Basic CID | 6 | 2 | Basic CID allocated from the former serving BS |
| Initiating BS ID | TBD | 6 | The unique identifier of the former BS allowing MSS to enter an idle mode |

The second base station 230 may receive the re-registration request from the MSS 250 and may set an action flag of an MSS_Info_Request backbone message to 2 (i.e., to indicate that the MSS 250 has moved to another paging zone, cf. Table 7). The second base station 230 may deliver the MSS_Info_Request backbone message to the first base station 220 (S22). Furthermore, upon receipt of the base station ID of the first base station 220 from the MSS 250, the second base station 230 may transmit the MSS_Info_Request backbone message to the first base station 220.

The first base station 220 receives the MSS_Info_Request from the second base station 230 and may notify the base stations within the paging zone of the first base station 220, i.e. within the first paging zone 225, that the MSS 250 has terminated the idle mode and is to be deleted from a paging list. Each of the base stations within the first paging zone 225 may receive the notification of termination of the idle mode by the MSS 250 and may delete the MSS 250 from the paging list to terminate the idle mode for the MSS 250.

Figure 3:
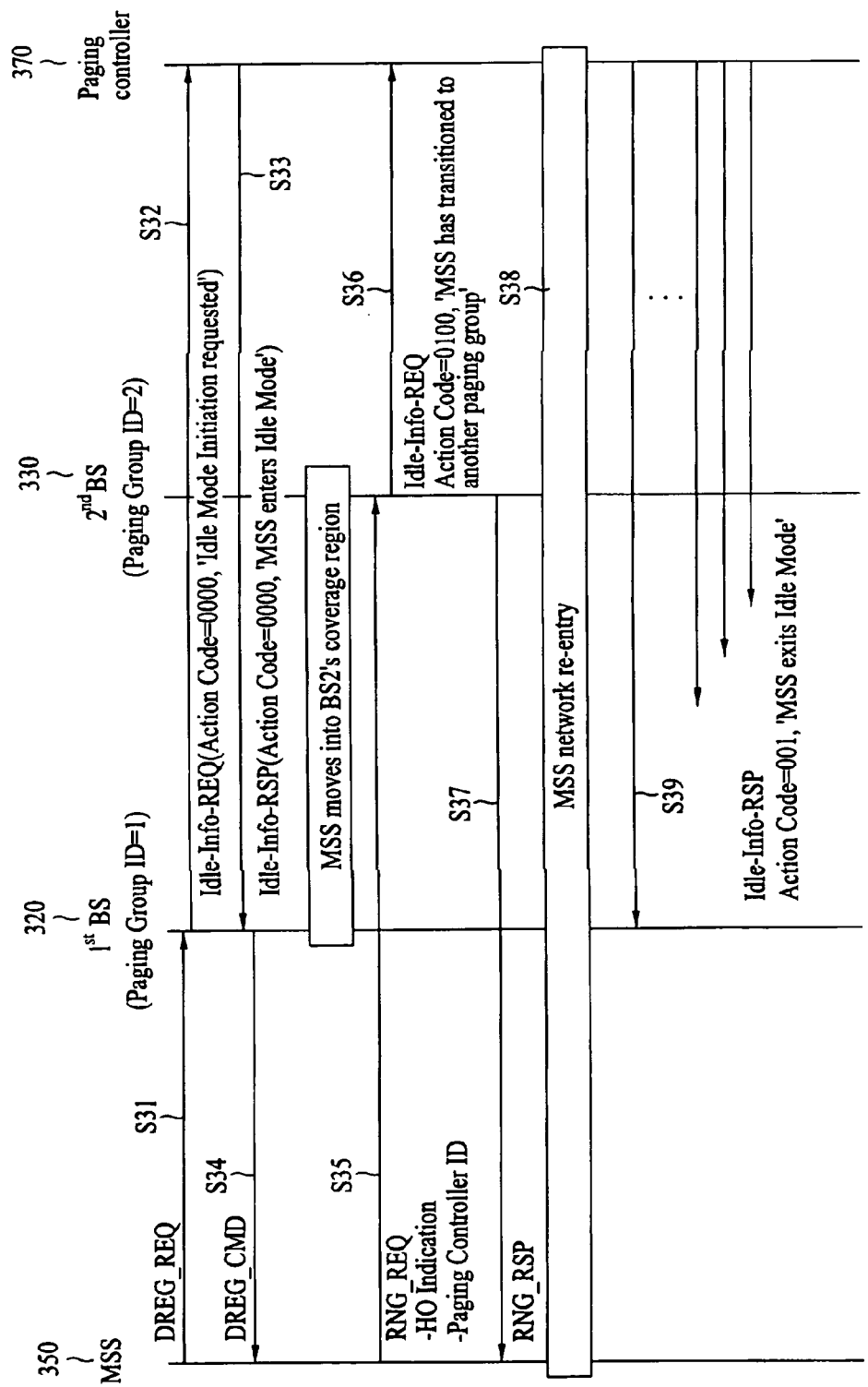
FIG. 3 is a diagram illustrating idle mode control in a wireless access system having a paging controller, according to a first embodiment of the present invention.

FIG. 3 is a diagram illustrating idle mode control in a wireless access system having a paging controller, according to a first embodiment of the present invention.

Referring to FIG. 3, when an MSS 350 attempts to enter an idle mode, the MSS 350 may transmit an idle mode entry request (e.g., DREG-REQ) message to a serving BS to which the MSS 350 belongs, such as a first BS 320, to request an idle mode entry (S31). The DREG-REQ message may include information pertaining to a request for de-registration from the serving BS to which the MSS 350 belongs (e.g., de-registration request code), as well as TLV encoded information (e.g., Paging Cycle Request TLV, Idle Mode Retain Information TLV, MAC Hash Skip Threshold TLV).

The first BS 320 may receive the idle mode entry request message from the MSS 350 and may transmit an idle mode information request message to provide information pertaining to the MSS 350 requesting the idle mode entry to a paging controller 370 (S32). Table 9 shows an exemplary idle mode information request message.

TABLE 9

| Field | Size | Notes |
|---|---|---|
| Idle-Info-REQ message format( ){ | | |
| Global Message Header | 12 bits | |
| For(i=0; i<Num Records; i++){ | | |
| MSS MAC Address | 48 bits | |
| Action Code | 4 bits | 0000: Idle Mode Initiation Request<br>0001: DL Traffic has arrived to MSS<br>0010: MSS session information<br>0011: MSS re-entry complete<br>0100: MSS has transitioned to another paging group<br>0101-1111: reserved |
| Reserved | 4 bits | |
| TLV encoded information | Variable | |
| Num_SFID_Records | 8 bits | |
| For(i=1; i<Num_SFID_Records; i++){ | | |
| SFID | 32 bits | |
| Num_QoS_Records | 8 bits | |
| For(i=1; i<Num_QoS_Records; i++) | | |
| TLV encoded information | variable | 11.13 Service flow management encodings |
| }<br>}<br>} | | |
| Security Field<br>} | TBD | A means to authenticate this message |

| Name | Type | Length | Value |
|---|---|---|---|
| Paging Information | | 4 | 0-7: Paging Group ID<br>8-23: Paging Cycle<br>24-31: Paging Offset |
| Paging Controller ID | | 4 | Logical network identifier for the serving BS or other network entity retaining MSS Service and operational information and/or administering paging activity for the MSS while in Idle Mode. |
| Idle Mode Retain Information | | variable | The first 8 bits of this item indicates Idle Mode Retain Information included in DREG-CMD message, and the rest are MSS service and operational information associated with Idle Mode Retain Information. This item may be included in Idle-Info-REQ message with Action Code = 0000. |

TABLE 9-continued

| | | |
|---|---|---|
| MAC Hash Skip Threshold | 1 | Maximum number that BS is allowed to skip MSS MAC address hash of an MSS in successive MOB_PAG-ADV messages when an Action Code for the MSS is 00, 'No Action Required'. The unit is the number of MOB_PAG-ADV message transmissions. |
| HO Optimization flag | 1 | This item may be included in Idle-Info-REQ message with Action Code = 0011. |

Referring to Table 9, the idle mode information request message may include information that a specific MSS has requested an idle mode entry. The idle mode information request message may also include a MSS MAC address, MSS service flow information, and TLV encoded information (e.g., Idle Mode Retain Information TLV, MAC Hash Skip Threshold TLV).

The paging controller 370 may receive the idle mode information request message and may transmit an idle mode information response (e.g., Idle-Info-RSP) message to the serving BS, that is the first BS 320 (S33).

Table 10 shows an exemplary idle mode information response (Idle-Info-RSP) message.

TABLE 10

| Field | Size | Notes |
|---|---|---|
| Idle-Info-RSP message format( ){ | | |
| Global Message Header | 152 bits | |
| For(i=0; i<Num Records; i++){ | | |
| MSS MAC Address | 48 bits | |
| Action Code | 4 bits | 0000: MSS enters Idle Mode<br>0001: MSS exits Idle Mode<br>0010: MSS session information<br>0011: Deliver DL Traffic to Current Attachment BS<br>0100: Location Update Success<br>0101: Location Update Failure<br>0110-1111: reserved |
| Reserved | 4 bits | |
| TLV encoded information | Variable | |
| For(i=1; i<Num_SFID_Records; i++){ | | |
| SFID | 32 bits | |
| Num_QoS_Records | 8 bits | |
| For(i=1; i<Num_QoS_Records; i++) | | |
| TLV encoded information | variable | 11.13 Service flow management encodings |
| } | | |
| } | | |
| } | | |
| Security Field | TBD | A means to authenticate this message |
| } | | |

| Name | Type | Length | Value |
|---|---|---|---|
| Paging Information | | 4 | 0-7: Paging Group ID<br>8-23: Paging Cycle<br>24-31: Paging Offset |
| Paging Controller ID | | 6 | Logical network identifier for the serving BS or other network entity retaining MSS Service and operational information and/or administering paging activity for the MSS while in Idle Mode. |
| Idle Mode Retain Information | | 1 | The first 8 bits of this item indicates Idle Mode Retain Information included in DREG-CMD message, and the rests are MSS service and operational information associated with Idle Mode Retain Information. This item may be included in Paging-announce message with Action Code = 0011. |
| Current Attachment BS ID | | 6 | BS ID to which MSS in Idle Mode attempts to re-enter network. This item may be included in Idle-Info-RSP message if Action Code is 0011. |
| Last Attachment BS ID | | 6 | BS ID in which MSS enters Idle Mode. Last Attachment BS may be updated after successful Location Update. This item may be included in Idle-Info-RSP message if Action Code is 0010. |

TABLE 10-continued

| | | |
|---|---|---|
| MAC Hash Skip Threshold | 1 | Maximum number that BS is allowed to skip MSS MAC address hash of an MSS in successive MOB_PAG-ADV messages when an Action Code for the MSS is 00, 'No Action Required'. The unit is the number of MOB_PAG-ADV message transmissions. |
| HO Optimization flag | 1 | This item may be included in Idle-Info-RSP message with Action Code = 0011. 'MSS re-entry complete'. |

Referring to Table 10, the idle mode information response (Idle-Info-RSP) message may preferably include information that the MSS 350 has entered an idle mode, a MSS MAC address, MSS service flow information, and TLV encoded information (e.g., Paging Information TLV, Paging controller ID TLV, Idle Mode Retain Information TLV, MAC Hash Skip Threshold TLV).

A second BS 330 may receive the idle mode information response (Idle-Info-RSP) message and may transmit an idle mode command (e.g., DREG-CMD) message to the MSS 350 (S34). The idle mode command message may include information pertaining to a command to enter the idle mode, as well as TLV encoded information (e.g., Paging Information TLV, Paging controller ID TLV, Idle Mode Retain Information TLV, MAC Hash Skip Threshold TLV).

In one embodiment, if the MSS 350 transitions to an area belonging to the second BS 330, which is part of another paging group, i.e. Paging group ID=2, then the MSS 350 may transmit a ranging request message RNG_REQ that includes a handover indicator TLV and a paging controller ID TLV to the second BS 330 (S35) to notify the second BS 330 that the idle mode will be terminated. The second BS 330 may deliver an idle mode information request (e.g., Idle-Info-REQ) message to the paging controller 370 with a paging controller ID received via the ranging request message to notify the paging controller 370 that the MSS 350 has terminated the idle mode (S36).

Furthermore, the second BS 330 may transmit a ranging response message RNG_RSP to the MSS 350 (S37). The MSS 350 may also perform a network entry procedure based on the ranging response message (S38). The paging controller 370 may transmit an idle mode information response message to all BSs belonging to the same paging group as the first BS 320, i.e. Paging group ID=1, to notify the BSs that the MSS 350 has terminated the idle mode (S39). In response to receipt of the idle mode information response message, each BS in Paging group ID=1 may update a list of MSSs currently in idle mode.

Figure 4:
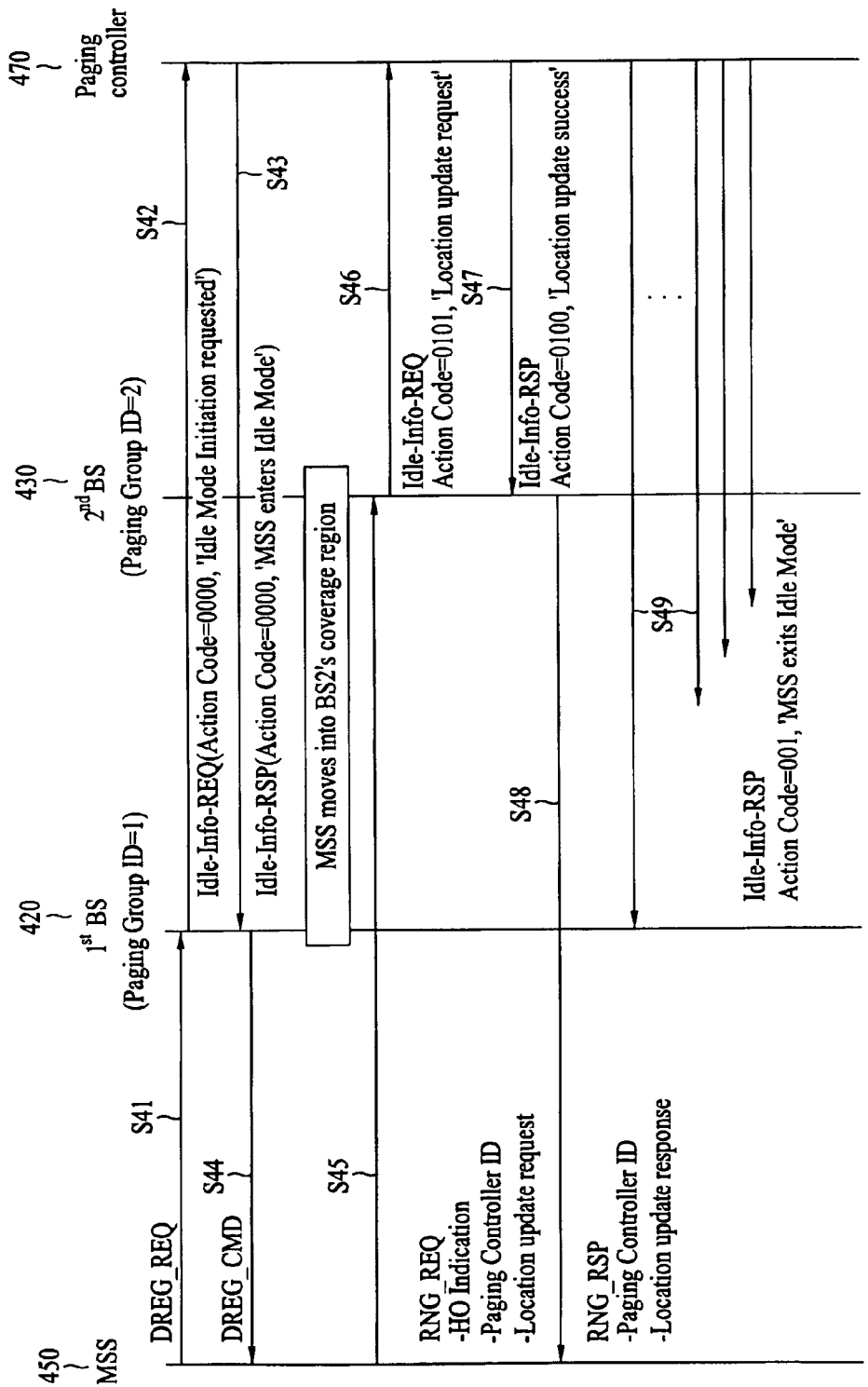
FIG. 4 is a diagram illustrating idle mode control in a wireless access system having a paging controller, according to a second embodiment of the present invention.

FIG. 4 is a diagram illustrating idle mode control in a wireless access system having a paging controller, according to a second embodiment of the present invention.

Referring to FIG. 4, when an MSS 450 attempts to enter an idle mode, the MSS 450 may transmit an idle mode entry request (e.g., DREG-REQ) message to a serving BS to which the MSS 450 belongs, such as a first BS 420, to request an idle mode entry (S41). The DREG-REQ message may include information pertaining to a request for de-registration from the serving BS to which the MSS 450 belongs (de-registration request code), as well as TLV encoded information (e.g., Paging Cycle Request TLV, Idle Mode Retain Information TLV, MAC Hash Skip Threshold TLV).

The first BS 420 may receive the idle mode entry request message from the MSS 450 and may transmit an idle mode information request message to provide information pertaining to the MSS 450 requesting the idle mode entry to a paging controller 470 (S42). Table 9 shows an exemplary idle mode information request message. The idle mode information request message, as shown in Table 9, may preferably include information that a specific MSS has requested an idle mode entry, a MSS MAC address, MSS service flow information, and TLV encoded information (e.g., Idle Mode Retain Information TLV, MAC Hash Skip Threshold TLV).

The paging controller 470 may receive the idle mode information request message and may transmit an idle mode information response (Idle-Info-RSP) message to the serving BS, that is the first BS 420 (S43). Table 10 shows an exemplary idle mode information response (Idle-Info-RSP) message.

The idle mode information response (Idle-Info-RSP) message, as shown in Table 10, may preferably include information that the MSS 450 has entered an idle mode, as well as a MSS MAC address, MSS service flow information, and TLV encoded information (e.g., Paging Information TLV, Paging controller ID TLV, Idle Mode Retain Information TLV, MAC Hash Skip Threshold TLV).

A second BS 430 may receive the idle mode information response (Idle-Info-RSP) message and may transmit an idle mode command (DREG-CMD) message to the MSS 450 (S44). The idle mode command message may include information pertaining to a command to enter the idle mode, as well as TLV encoded information (e.g., Paging Information TLV, Paging controller ID TLV, Idle Mode Retain Information TLV, MAC Hash Skip Threshold TLV).

In another embodiment, if the MSS 450 transitions to an area belonging to the second BS 430, which is part of another paging group, i.e. Paging group ID=2, then the MSS 450 may transmit a ranging request message RNG_REQ that preferably includes a handover indicator TLV, a paging controller ID TLV, and a location update request TLV to the second BS 430 (S45). The second BS 430 may transmit an idle mode information request message to the paging controller 470 (S46).

Furthermore, the paging controller 470 may transmit an idle mode information response message to all BSs belonging to the paging group of the first BS 420, i.e. Paging group ID=1, to notify the BSs that the MSS 450 has terminated the idle mode (S49). In response to receipt of the idle mode information response message, each BS in Paging group ID=1 may update a list of MSSs currently in idle mode.

FIG. 5 is a diagram illustrating idle mode control in a wireless access system having a paging controller, according to a third embodiment of the present invention.

Referring to FIG. 5, when an MSS 550 attempts to enter an idle mode, the MSS 550 may transmit an idle mode entry request (DREG-REQ) message to a serving BS to which the MSS 550 belongs, such as a first BS 520, to request an idle mode entry (S51). The DREG-REQ message may include information pertaining to a request for de-registration from the serving BS to which the MSS 550 belongs (de-registration request code), as well as TLV encoded information (e.g., Paging Cycle Request TLV, Idle Mode Retain Information TLV, MAC Hash Skip Threshold TLV).

The first BS 520 may receive the idle mode entry request message from the MSS 550 and may transmit an idle mode information request message to provide information pertaining to the MSS 550 requesting the idle mode entry to a paging controller 570 (S52). Table 9 shows an exemplary idle mode information request message. The idle mode information request message, as shown in Table 9, may preferably include information that a specific MSS has requested an idle mode entry, a MSS MAC address, MSS service flow information, and TLV encoded information (e.g., Idle Mode Retain Information TLV, MAC Hash Skip Threshold TLV).

The paging controller 570 may receive the idle mode information request message and may transmit an idle mode information response (Idle-Info-RSP) message to the serving BS, that is the first BS 520 (S53). Table 10 shows an exemplary idle mode information response (Idle-Info-RSP) message.

The idle mode information response (Idle-Info-RSP) message, as shown in Table 10, may preferably include information that the MSS 550 has entered an idle mode, as well as a MSS MAC address, MSS service flow information, and TLV encoded information (e.g., Paging Information TLV, Paging controller ID TLV, Idle Mode Retain Information TLV, MAC Hash Skip Threshold TLV).

A second BS 530 may receive the idle mode information response (Idle-Info-RSP) message and may transmit an idle mode command (DREG-CMD) message to the MSS 550 (S54). The idle mode command message may include information pertaining to a command to enter the idle mode, as well as TLV encoded information (e.g., Paging Information TLV, Paging controller ID TLV, Idle Mode Retain Information TLV, MAC Hash Skip Threshold TLV).

In response to the ranging request message, the second BS 530 may notify the MSS 550 that a location update procedure is requested via a ranging response message. The MSS 550 may then perform a procedure for re-entering a network (S57). If the MSS 550 performs the network re-entry procedure, the second BS 530 may transmit an idle mode information request message to the paging controller 570 to notify the paging controller 570 that the MSS 530 has re-entered the network (S58).

Furthermore, the paging controller 570 may transmit an idle mode information response message to all BSs belonging to the paging group of the first BS 520, i.e. Paging group ID=1, to notify the BSs that the MSS 550 has terminated the idle mode (S59). In response to receipt of the idle mode information response message, each BS in Paging group ID=1 may update a list of MSSs currently in idle mode.

FIG. 6 is a diagram illustrating idle mode control in a wireless access system having a paging controller, according to a fourth embodiment of the present invention.

Referring to FIG. 6, when an MSS 650 attempts to enter an idle mode, the MSS 650 may transmit an idle mode entry request (DREG-REQ) message to a serving BS to which the MSS 650 belongs, such as a first BS 620, to request an idle mode entry (S61). The DREG-REQ message may include information pertaining to a request for de-registration from the serving BS to which the MSS 650 belongs (de-registration request code), as well as TLV encoded information (e.g., Paging Cycle Request TLV, Idle Mode Retain Information TLV, MAC Hash Skip Threshold TLV).

The first BS 620 may receive the idle mode entry request message from the MSS 650 and may transmit an idle mode information request message to provide information pertaining to the MSS 650 requesting the idle mode entry to a paging controller 670 (S62). Table 9 shows an exemplary idle mode information request message. The idle mode information request message, as shown in Table 9, may preferably include information that a specific MSS has requested an idle mode entry, a MSS MAC address, MSS service flow information, and TLV encoded information (e.g., Idle Mode Retain Information TLV, MAC Hash Skip Threshold TLV).

The paging controller 670 may receive the idle mode information request message and may transmit an idle mode information response (Idle-Info-RSP) message to the serving BS, that is the first BS 620 (S63). Table 10 shows an exemplary idle mode information response (Idle-Info-RSP) message.

The idle mode information response (Idle-Info-RSP) message, as shown in Table 10, may preferably include information that the MSS 650 has entered an idle mode, as well as a MSS MAC address, MSS service flow information, and TLV encoded information (e.g., Paging Information TLV, Paging controller ID TLV, Idle Mode Retain Information TLV, MAC Hash Skip Threshold TLV).

A second BS 630 may receive the idle mode information response (Idle-Info-RSP) message and may transmit an idle mode command (DREG-CMD) message to the MSS 650 (S64). The idle mode command message may include information pertaining to a command to enter the idle mode, as well as TLV encoded information (e.g., Paging Information TLV, Paging controller ID TLV, Idle Mode Retain Information TLV, MAC Hash Skip Threshold TLV).

In yet another embodiment, if the MSS 650 transitions to an area belonging to the second BS 630, which is part of another paging group, i.e. Paging group ID=2, then the MSS 650 may transmit a ranging request message for a location update to the second BS 630 (S65).

In response to the ranging request message, the second BS 630 may deliver an idle mode information request message to the paging controller 670 to notify the paging controller 670 that the MSS 650 has requested a location update (S66). If the paging controller 670 is unable to perform the requested procedure for the location update, the paging controller 670 may notify the second BS 630 that the requested location update procedure is unavailable via an idle mode information response message (S67). The second BS 630 may notify the MSS 650 that the location update procedure has failed via a ranging response message (S68). The MSS 650 may then perform a procedure for re-entering a network based on the ranging response message (S69).

Once network re-entry is completed, the second BS 630 may notify the paging controller 670 that the network re-entry procedure is terminated via an idle mode information request message (S70). Furthermore, the paging controller 670 may transmit an idle mode information response message to all BSs belonging to the paging group of the first BS 620, i.e. Paging group ID=1, to notify the BSs that the MSS 650 has terminated the idle mode (S69). In response to receipt of the idle mode information response message, each BS in Paging group ID=1 may update a list of MSSs currently in idle mode.

In one embodiment, in a method of controlling idle mode between a mobile subscriber station and a network at least comprising a serving base station associated with a serving paging group and a target base station associated with a target paging group, the method comprises requesting to enter an idle mode by the mobile subscriber station by transmitting an idle mode request to the serving base station having a serving paging group identifier with which the serving base station is associated and the serving base station identifier. The method also comprises entering the idle mode by receiving an idle mode grant command from the serving base station, the idle mode grant command comprising the serving base station identifier and the serving paging group identifier. The method also comprises initiating a ranging request between the mobile subscriber station and the target base station associated with the target paging group, wherein the ranging request comprises the serving base station identifier and the serving paging group identifier. The method also comprises connecting with the target base station, wherein the serving base station is informed, by using the serving base station identifier, that the mobile subscriber station is not in the idle mode with the serving base station.

The network may preferably further comprise a paging controller that is operatively connected to the serving base station. The serving base station identifier may preferably be substituted with a paging controller identifier that is associated with the paging controller. The ranging request to the target base station may preferably further comprise a location update request. The method may preferably further comprise receiving a ranging response from the target base station, wherein the ranging response comprises a location update response.

In another embodiment, in a method of controlling idle mode between a mobile subscriber station and a network comprising at least a serving base station associated with a serving paging group and a target base station associated with a target paging group, the method comprises receiving an idle mode request from the mobile subscriber station to the serving base station to enter an idle mode by the mobile subscriber station, the serving base station having a serving paging group identifier with which the serving base station is associated and the serving base station identifier. The method also comprises transmitting an idle mode grant command to the mobile subscriber station from the serving base station, the idle mode grant command comprising the serving base station identifier and the serving paging group identifier. The method also comprises receiving a connection request from the mobile subscriber station to the target base station associated with the target paging group, wherein the connection request comprises the serving base station identifier and the serving paging group identifier. The method also comprises connecting with the target base station, wherein the serving base station is informed, by using the serving base station identifier, that the mobile subscriber station is not in the idle mode with the serving base station.

The connection request to the target base station may preferably further comprise a location update request. The method may preferably further comprise transmitting an idle mode information request message to the paging controller, receiving an idle mode information response from the paging controller, and transmitting a ranging response to the mobile subscriber station.

The paging controller may preferably inform the serving base station and other base stations associated with the serving paging group that the mobile subscriber station is not in the idle mode with the serving base station. The paging controller may preferably inform the target base station and other base stations associated with the target paging group that the mobile subscriber station re-entered the idle mode with the target base station.

Accordingly, in controlling an idle mode of a mobile subscriber station in a wireless access system according to the present invention, if the MSS in the idle mode deviates from a paging zone, the idle mode for the former paging zone may be efficiently terminated. Thus, the present invention may prevent unnecessary traffic. Furthermore, the present invention may provide efficient control of the idle mode using a paging controller.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A method of controlling idle mode between a mobile subscriber station and a network at least comprising a serving base station and a target base station, the method comprising:
   requesting to enter an idle mode by the mobile subscriber station by transmitting an idle mode request to the serving base station;
   entering the idle mode by receiving an idle mode grant command from the serving base station, the idle mode grant command including an identifier (ID) of a paging controller which is a network entity retaining service and operational information for the mobile subscriber station and/or administering paging activity for the mobile subscriber station while in the idle mode;
   transmitting a ranging request message to the target base station, wherein the ranging request message includes the paging controller ID;
   receiving a ranging response message in response to the ranging request message from the target base station; and
   performing a network re-entry procedure with the target base station based on the ranging response message,
   wherein the target base station informs the serving base station via the paging controller using the paging controller ID that the idle mode of the mobile subscriber station is terminated.

2. The method of claim 1, wherein the ranging request message further comprises a location update request.

3. The method of claim 2, wherein the ranging response message includes a location update response.

4. The method of claim 1, wherein the network entity is the serving base station.

5. The method of claim 1, wherein the network entity is an entity other than the serving base station.

6. A method of controlling idle mode between a mobile subscriber station and a network comprising at least a serving base station and a target base station, the method comprising:
   receiving an idle mode request from the mobile subscriber station at the serving base station to enter an idle mode by the mobile subscriber station;
   transmitting an idle mode grant command to the mobile subscriber station from the serving base station, the idle mode grant command including an identifier (ID) of a paging controller which is a network entity retaining service and operational information for the mobile subscriber station and/or administering paging activity for the mobile subscriber station while in the idle mode;
   receiving a ranging request message from the mobile subscriber station at the target base station, wherein the ranging request message includes the paging controller ID;
   transmitting a ranging response message from the target base station to the mobile subscriber station in response to the ranging request message; and
   performing a network re-entry procedure at the mobile subscriber station with the target base station based on the ranging response message, wherein the target base station informs the serving base station via the paging controller using the paging controller ID that the idle mode of the mobile subscriber station is terminated.

7. The method of claim 6, wherein the raging request message further comprises a location update request.

8. The method of claim 7, further comprising:
transmitting an idle mode information request message from the target base station to the paging controller; and
receiving an idle mode information response at the target base station from the paging controller.

9. The method of claim 6, wherein the network entity is the serving base station.

10. The method of claim 6, wherein the network entity is an entity other than the serving base station.

* * * * *